United States Patent [19]

Terry

[11] Patent Number: 4,708,555
[45] Date of Patent: Nov. 24, 1987

[54] LOCKING FASTENER

[76] Inventor: Sydney L. Terry, 23409 Jefferson Ave., St. Clair Shores, Mich. 48080

[21] Appl. No.: 811,113

[22] Filed: Dec. 19, 1985

[51] Int. Cl.⁴ ............................................. F16B 39/24
[52] U.S. Cl. ..................................................... 411/149
[58] Field of Search ................... 411/149–159, 411/160–164, 225–240, 144–149; 29/526 R

[56] References Cited

U.S. PATENT DOCUMENTS

| | | | |
|---|---|---|---|
| 423,738 | 3/1890 | Collins | 411/227 |
| 524,895 | 8/1894 | Fulton | 411/240 |
| 910,712 | 1/1909 | McCoy | 411/149 |
| 1,066,761 | 7/1913 | Semon et al. | 411/153 |
| 1,894,631 | 1/1933 | Owen | 411/144 |
| 2,016,000 | 10/1935 | Freeland | 411/225 |
| 2,262,439 | 11/1941 | Simpson | 411/152 |
| 2,665,729 | 1/1954 | Terry | 411/158 |

FOREIGN PATENT DOCUMENTS

| | | | |
|---|---|---|---|
| 684466 | 11/1939 | Fed. Rep. of Germany | 411/149 |
| 2473 | of 1896 | United Kingdom | 411/144 |
| 14486 | of 1903 | United Kingdom | 411/146 |
| 514923 | 11/1939 | United Kingdom | 411/149 |

Primary Examiner—James L. Ridgill, Jr.
Attorney, Agent, or Firm—Krass & Young

[57] ABSTRACT

A locking fastener in which coacting ramp surfaces are employed to generate wedging forces in response to backing-off movement of the associated nut which urges the nut into tighter engagement with the associated bolt and workpiece and in which spring means are provided which are compressed during the tightening operation and which bias the ramp surfaces for movement in a direction to augment the locking action of the fastener.

11 Claims, 15 Drawing Figures

LOCKING FASTENER

FIELD OF THE INVENTION

This invention relates to locking fasteners and particularly to locking fasteners of the type employing coacting wedge ramps.

BACKGROUND OF THE INVENTION

Locking fasteners are available in which coacting wedge ramps operate to generate wedging forces as the associated nut tends to back off of the associated bolt and these wedging forces are arranged to urge the nut into tighter engagement with the associated bolt and workpiece. These prior art ramp locking wedge fasteners inherently require a higher coefficient of friction between the fastener and the seat engaged by the fastener and between the fastener and the nut than between the contacting wedge surfaces of the fastener. This higher coefficient is usually provided by incorporating radial teeth or serrations on the fastener surfaces where a high friction coefficient is required. If this requirement is not met under all operating conditions, there is no locking action. However, if the teeth do bite into the seat and the nut, the initial loosening of the nut results in movement between the wedge surfaces of the fastener and the tension in the bolt due to initial tightening will actually be increased. These prior art wedge ramp locking fasteners also have the inherent property of requiring a breakaway torque for removing the nut of greater magnitude than the tightening torque used to apply the nut. Whereas locking fasteners operating on these wedge ramp principles work very well in static demonstrations, they have not achieved any widespread commercial acceptance since the nuts associated with the fasteners have tended to back off under the high frequency vibratory loading typically encountered in real life commercial environments.

SUMMARY OF THE INVENTION

This invention is directed to providing an improved locking fastener which is effective to preclude loosening of the associated nut even under high frequency vibratory load conditions.

The invention is further directed to reducing or eliminating the requirements for different coefficients of friction between the various involved surfaces.

The invention basically comprises adding a spring means to the wedge ramp construction and arranging the spring means in such a way that it is compressed or otherwise loaded as the mating wedge surfaces are moved relative to each other as the nut is tightened. Thus a portion of the energy expended to tighten the nut is used to load the spring means.

In broad combination, the invention locking fastener comprises a first portion; a second portion movable relative to the first portion; means operative in response to relative movement between the portions in one direction to decrease the overall axial height of the fastener and operative in response to relative movement between the portions in the opposite direction to increase the overall height of the fastener; and spring means yieldably resisting relative movement of the portions in the one direction and biasing the portions for movement in the opposite direction. With this arrangement, as the portions are moved relative to each other in the tightening operation to decrease the overall axial height of the fastener, the spring means is loaded so that it tends to bias the portions for movement in a direction to expand the overall height of the fastener and thereby augment the locking action of the fastener.

According to a basic feature of the invention, the expansion means comprises coacting, parallel, first and second ramp surfaces on the first and second portions inclined at a greater angle than the thread angle of the associated threaded member. With this arrangement, as the associated nut is threaded onto the associated threaded member, the ramp surfaces move relative to one another in a direction to decrease the overall axial height of the fastener so that loosening movement of the fastener results in attempted expansion of the overall height of the fastener with a resultant resistance to the loosening action.

According to one embodiment of the invention, the fastener comprises a split lockwasher formed of a spring material and having a relaxed configuration in which its opposite ends are spaced; the opposite ends of the lockwasher respectively constitute the first and second fastener portions; and the ramps are configured to undergo relative movement in the direction of decreasing axial height in response to radial contraction of the lockwasher. With this arrangement, as the associated nut is threaded onto the associated threaded member and into locking engagement with the invention lock washer, the ramp surfaces undergo relative sliding movement in a direction to decrease the overall height of the lockwasher against the bias generated by the inherent preload of the lockwasher so that the inherent spring force of the lockwasher tends to attempt to move the ramp surfaces in a direction to expand the axial height of the fastener with a resultant resistance to loosening of the associated nut.

According to a feature of this embodiment of the invention, each of the ramp surfaces extends from the respective end face of the lock washer; a generally axially extending abutment surface extends from the inboard end of each ramp surface to the adjacent upper or lower face of the lockwasher; and each end face is spaced circumferentially from the associated abutment surface in the relaxed configuration of the lockwasher so that as the nut is tightened on the lockwasher, the lockwasher contracts to move the respective end faces into abutment with the respective abutment surfaces.

According to a further feature of this embodiment, the ramp surfaces are spaced axially in the relaxed configuration of the lockwasher so that the lockwasher includes both an axial and a radial preload and both of the preload forces attempt to move the lockwasher in an expanding direction to augment the locking action of the washer.

In another disclosed embodiment of the invention, the fastener comprises a spring washer having a helical configuration with successive convolutions of the helix spaced axially in the relaxed configuration of the washer, and a plurality of pairs of first and second ramp surfaces are provided at circumferentially spaced locations around the convolutions of the lockwasher with each ramp surface pair comprising a first ramp surface on the upper face of a lower convolution and a second ramp surface on the confronting lower surface of an upper convolution. This arrangement has the advantage of distributing the wedging forces around the circumference of the fastener.

According to another embodiment of the invention, the fastener comprises an upper annular member constituting the first portion and a lower annular member constituting the second portion; the first and second ramp surfaces are defined respectively on the upper face of the lower annular member and the confronting lower face of the upper annular member; and the spring means comprises a resilient member positioned between the first ramp surface on the lower member and the second ramp surface on the upper annular member and arranged to be loaded in response to relative movement of the ramp surfaces in a locking direction. This arrangement allows damping forces, which resist vibratory loosening forces, to be easily built in by making the spring of rubber or other rubber-like plastic. This arrangement has the further advantage of balancing the locking axial forces when a loosening torque is applied. A further advantage of this arrangement is that the rubber or rubber-like plastic springs may be used to join the two annular members together while still acting as a spring with a firm bottoming-out point. This arrangement not only provides a convenience in assembly but also serves to hold the two annular members in the proper relative angular position for an accurate and predetermined spring preload.

According to a feature of this embodiment, a plurality of pairs of first and second ramp surfaces are respectively provided at circumferentially spaced locations around the first and second annular members, and a resilient member is positioned between each pair of ramp surfaces and arranged to be loaded in response to relative movement of the associated ramp surfaces in a locking direction. This arrangement provides circumferential distribution of the locking and damping forces while at the same time maximizing the amount of circumferential space available for the damping and locking actions.

In a first form of this embodiment of the invention, the upper and lower annular members comprise upper and lower washers; the upper washer has serrations on its upper face; and the lower washer has serrations on its lower face.

In a further form of this embodiment, the lower annular member comprises a washer and the upper member comprises a nut adapted to be threaded onto the elongated threaded member and into wedging engagement with the underlying washer.

According to a further feature of the invention, a method is provided for securely tightening a nut onto a bolt. The invention method relies on the use of a locking fastener of the type including a first portion defining a first point, a second portion defining a second point and movable relative to the first portion; expansion means operative in response to relative movement between the portions in one direction to decrease the overall axial height of the fastener and operative in response to relative movement between the portions in the opposite direction to increase the overall height; and spring means yieldably resisting relative movement of the portions in the one direction and biasing the portions for movement in the opposite direction. According to the invention tightening method, the locking fastener is positioned on the bolt between the nut and a seating surface; the nut is threadably tightened downwardly on the bolt and downwardly onto the fastener to move the fastener portions in the tightening direction to decrease the overall axial height of the fastener against the yieldable resistance of the spring means; and the nut is thereafter backed off a fraction of a revolution to set the first point on the first portion of the locking fastener into the confronting surface portion of the nut and set the second point on the second portion of the locking fastener into the confronting surface portion of the seating surface. This backing-off action thus sets the locking fastener into both a nut and a washer seat, thereby greatly increasing the effective coefficient or friction between these surfaces and greatly decreasing the chance of the nut backing-off further under vibration; increases the holding power or tension in the bolt; and removes some or all of the twist or torsional deflection in the bolt left over from the original tightening operation.

DETAILED DESCRIPTION OF THE PREFERRED EMBODIMENTS

Figure 1:
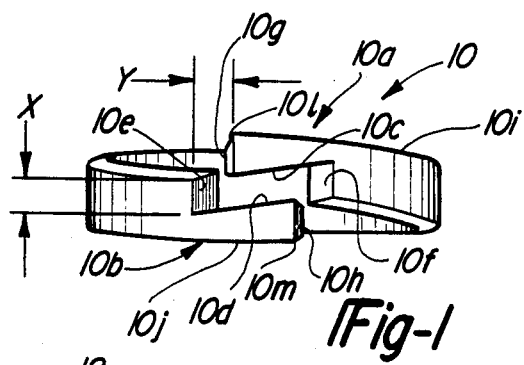
FIG. 1 is a side view of a first embodiment of the invention locking fastener.
Figure 2:
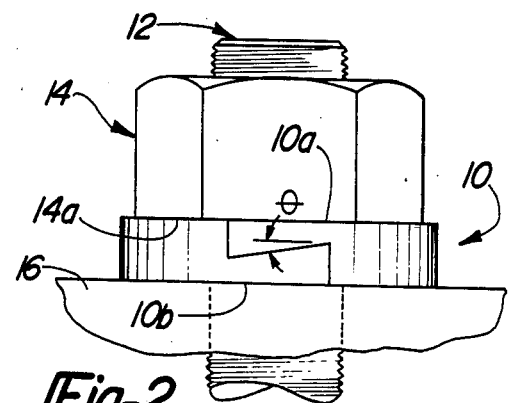
FIG. 2 is a view of the locking fastener of FIG. 1 in use with an associated nut.
Figure 3:
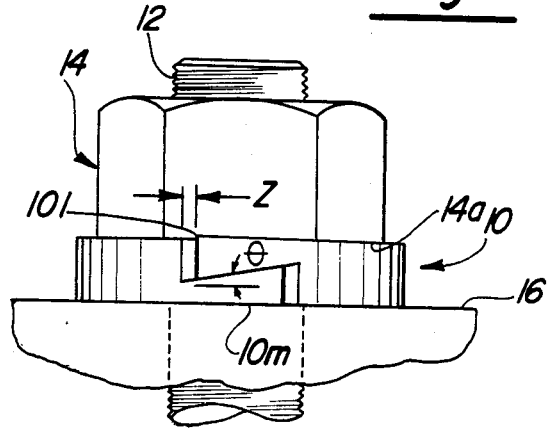
FIG. 3 is a view showing the nut and locking fastener of FIG. 2 in a backed-off condition.

The invention locking fastener embodiment seen in FIGS. 1–3 comprises a split lockwasher 10 formed of a suitable spring steel.

Lockwasher 10 includes end portions 10a and 10b formed with coacting ramp surface 10c and 10d and coacting abutment surfaces 10e and 10f. Ramp surfaces 10c and 10d extend inwardly from the respective end face 10g and 10h of the washer at an angle relative to the upper and lower faces 10i and 10j of the washer that is greater than the thread angle of the bolt or other fastener member with which the invention lock washer is to be used. For example, if the lockwasher of Figures 1–3 is intended for use with a threaded fastener having a thread angle of 3 degrees, the circumferential angle θ of ramp surfaces 10c and 10d relative to the upper and lower faces of the lock washer may be 10 degrees. End faces 10g and 10h and abutment surfaces 10e and 10f extend at approximately 90 degrees with respect to the upper and lower faces of the lockwasher.

In its relaxed configuration, as seen in FIG. 1, the invention lockwasher has built in free gaps or clearances in both an axial and a radial direction. Specifically, the ramp surfaces 10c and 10d are separated in the relaxed configuration by a dimension X and the end faces 10g and 10h are separated from the respective abutment surfaces 10e and 10f by a dimension Y. For example, for a lock washer having a nominal inside diameter of 1 inch and a thickness or height of 0.2 inches, the dimension X may be 0.1 inches and the dimension Y may be 0.1 inches.

The invention lock washer is intended for use with a threaded fastener 12 and a hex nut 14 and is designed such that both the axial and radial clearances are reduced to zero with the lockwasher nut and threaded fastener in their assembled or tightened configuration as seen in FIG. 2. Righthand threads are assumed for the fastener 12 and the nut 14 of FIG. 2. As the nut 14 is threaded onto the fastener 12, the lockwasher gradually moves to its bottomed-out condition in Figure 2 in which the end faces 10g and 10h move into abutment with the respective abutment surfaces 10e and 10f and the ramp surfaces 10c and 10d move into sliding, wedging coaction with one another. The various dimensions of the lockwasher are chosen so that the washer bottoms out and behaves as a metal solid washer at some point below the expected full torque of the nut and bolt joint. The lockwasher is further designed such that the combined height or thickness of the overlapped end portions of the washer in the loaded condition of the washer is equal to or slightly greater than the general thickness of the washer.

With the nut and bolt joint tightened to full torque as seen in FIG. 2, the cam surfaces 10c and 10d are fully engaged and the spring loading of the washer is exerting a force in a direction to drive the two ramp surfaces in opposite rotational directions and move them respectively up the associated ramp surfaces and away from the associated abutment surfaces. For such motion to take place, the end portions of the lockwasher must move to a position in which they take up more axial space than in the fully tightened configuration so that, in effect, any such separating movement has the effect of increasing the bolt tension and tightening the joint.

Whereas the fully contracted lockwasher as seen in FIG. 2 provides an effective locking action for the nut and bolt joint, the locking action of the invention lockwasher may be further augmented by backing the nut off by a small amount Z, as seen in FIG. 3, after the nut has been moved to its fully torqued position. This backing off will set the joint by causing the sharp hardened corners 10l and 10m of the lockwasher to respectively dig into the bottom face 14a of the nut and the face of the seating surface 16 against which the lockwasher is being pressed by the tightening action of the bolt. This backing off action provides a visual method of checking whether the washer is working properly since the gap Z can be seen visually and can be measured, and the freshly indented surfaces of the bottom of the nut and the seating surface, mated intimately and interlockingly with the sharp ends 10l and 10m of the washer, virtually guarantee that there will be no loosening rotational motion between the washer and the bottom of the nut or between the washer and the seating surface. The tension loading of the bolt will actually be increased by backing-off the nut a small amount after it has been fully torqued as long as the washer remains stationary relative to the seating surface. The backing-off step also takes out some or all of the residual twist in the bolt normally left in the bolt as a result of the tightening operation. Thus, the backing-off step as performed at assembly has three important advantages. Firstly, it sets the washer teeth into both the nut and the washer seat, thereby greatly increasing the effective coefficient or friction between these surfaces and greatly decreasing the chance of the nut backing-off further under vibration. Secondly, it increases the holding power or tension in the bolt. And thirdly, it takes out some or all of the twist or torsional deflection in the bolt left over from the tightening operation.

Figure 4:
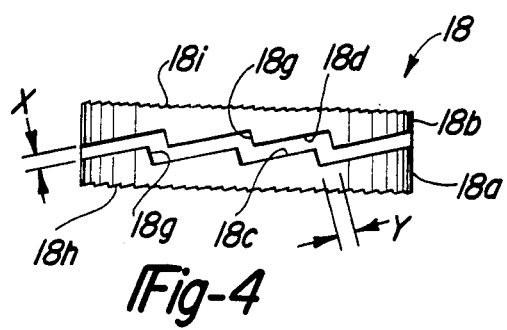
FIG. 4 is a side view of a second embodiment of the invention locking fastener.
Figure 5:
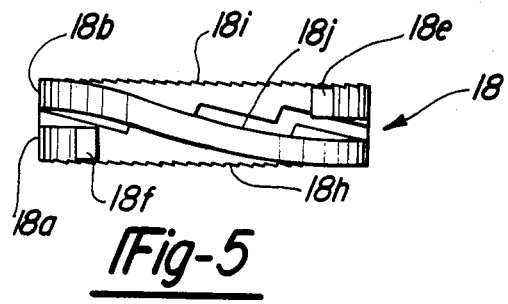
FIG. 5 is another side view of the locking fastener of FIG. 4 rotated 180° with respect to the view of FIG. 4.
Figure 6:
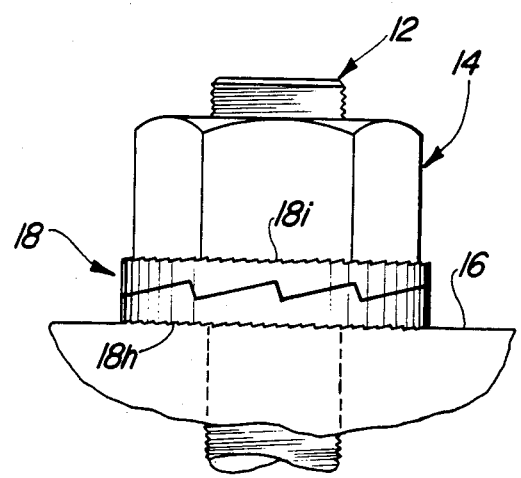
FIG. 6 is a view of the locking fastener of FIG. 4 in use with an associated nut.

The invention locking fastener seen in FIGS. 4, 5 and 6 comprises a spring washer 18 having a helical configuration with the successive convolutions 18a and 18b of the helix spaced axially in the relaxed configuration of the washer. A plurality of pairs of coacting ramp surfaces are provided around the circumference of the convolutions of the lockwasher with each pair comprising a first ramp surface 18c on the upper face of a lower convolution and a second coacting ramp surface 18d on the confronting lower face of an upper convolution. As with the single convolution lockwasher of the FIG. 1-3 embodiment, ramps 18c and 18d are inclined at a greater effective angle than the thread angle of the threaded fastener with which the lockwasher is to be used. Lockwasher 18 further includes end faces 18e and 18f, and an abutment surface 18g associated with each ramp surface. In the relaxed configuration of the lockwasher of FIGS. 4, 5 and 6 associated coacting ramp surfaces 18c and 18d are separated by an axial distance X and the associated abutment surfaces 18g are separated by a circumferential dimension Y. For example, for a spiral lockwasher having a nominal inside diameter of 1 inch and an effective thickness of 0.2 inches, the axial unloaded clearance dimension X may be 0.2 inches and the circumferential unloaded clearance dimension Y may be 0.1 inches.

As the nut 14 is tightened downwardly onto the threaded fastener 12, the axial and circumferential preloads of the lockwasher are taken up and the ramp surfaces 18c and 18d move into wedging sliding coaction and the abutment surfaces 18g move into abutting relation to define the totally compressed condition of the lockwasher as seen in FIG. 6. As with the embodiment of FIGS. 1-3, the lockwasher moves into its totally compressed or bottomed-out condition well before the expected full torque of the nut and bolt joint is reached. Serrations 18h on the lower face of lower convolution 18a facilitate locking engagement of the washer with the seating surface 16 and serrations 18i on the upper face of upper convolution 18b facilitate locking engagement of the lockwasher with the lower face of nut 14. As seen in FIG. 5, lower and upper convolutions 18a and 18b may lie in vertically spaced, parallel, horizontal planes with the lower and upper convolutions joined by an upwardly cranked bridge portion 18j which is the devoid of ramp surfaces 18c, 18d.

Figure 7:
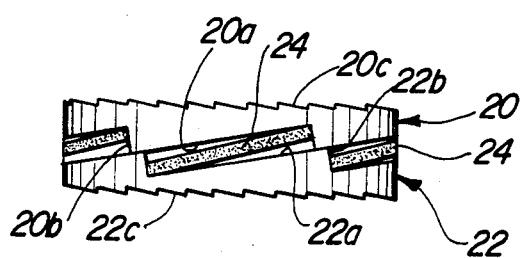
FIG. 7 is a side view of a further embodiment of the invention locking fastener with the fastener shown in an unloaded position.
Figure 8:
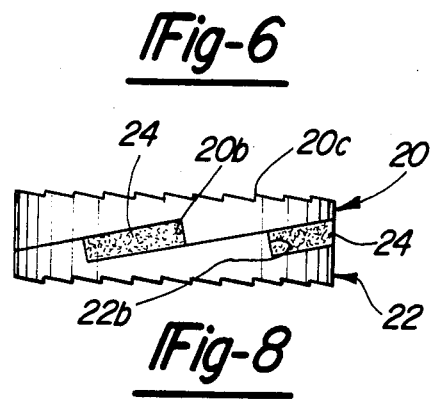
FIG. 8 is a view of the locking fastener of FIG. 7 shown in a loaded position.
Figure 9:
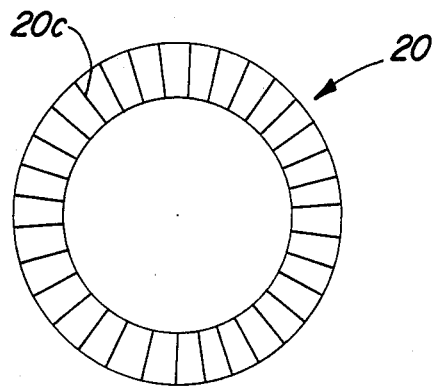
FIG. 9 is a top view of the locking fastener of FIGS. 7 and 8.

The locking fastener of the FIGS. 7-9 embodiment comprises an upper annular lockwasher 20, a lower annular lock washer 22, and a plurality of spring members 24.

Lockwashers 20 and 22 may be identical. Ramp surfaces 20a and 22a are provided respectively on the lower annular face of upper washer 20 and the upper annular face of lower washer 22. For example, three such pairs of ramp surfaces may be provided around the circumference of the lockwashers. Each ramp surface includes a coacting abutment surface 20b or 22b.

Spring members 24 comprise rubber elements which are interposed between each pair of coacting ramp surfaces 20a and 22a and which are moved into compression in response to relative rotational movement between the upper and lower washers occurring in response to tightening of the nut onto the fastener member and into rotational engagement with the upper face of the upper washer. Rubber members 24 are desirably suitably secured to the upper and lower washers so as to hold the upper and lower washers in an assembled relation and so as to relatively position the upper and lower washers for assembly purposes and ensure proper sliding coaction between the coacting ramp surfaces when the nut is tightened downwardly onto the lock washers.

Specifically, the rubber members can be bonded to the two lock washers in a manner to determine their relative circumferential and axial positions in their free or unloaded position, thereby determining the amount of the spring load and the amount of the breakaway torque that will finally cause the washer to break away and and thereby permit the nut to loosen on the bolt. For example, the opposite ends of each rubber segment 24 may be respectively secured to the two successive abutment surfaces 20b and 22b and the unloaded segment may occupy approximately half of the volume bounded by surfaces 20a, 22a, 20b, and 22b. As the nut is tightened downwardly onto the upper lock washer, and as best seen in FIG. 8, the ramp surfaces slide downwardly and wedgingly relative to one another and the rubber spring members are compressed to totally fill the decreased volume bounded surfaces 20a, 22a, 20b, and 22b. In this position, the rubber segments are loaded and act as springs urging the lockwashers to undergo relative rotation to move the ramp surfaces 20a up the associated ramp surfaces 22a and increase the effective thickness of the lockwasher assembly and thereby increase the bolt tension and tighten the joint.

As with the FIGS. 1-3 embodiment, the locking action of the lockwasher assembly may be augmented by backing the nut off a small amount after the nut has been brought up to full torgue so as to set the serrations 20c and 22c on the upper and lower faces respectively of the upper and lower lockwashers into the surface of the adjacent seating surface and into the surface of the adjacent nut so that no further motion in a loosening direction can take place.

For example, a typically highly loaded ⅜ inch bolted joint may have a 40 foot pound torque specification which normally produces between 3000 and 4000 pounds of tension in the bolt. With a correctly designed lockwasher of the type seen in FIGS. 7-9, the nut could be tightened to 35 foot pounds and than backed off approximately 10 degrees. Depending on the length of the bolt and other factors, the tension in the bolt would then actually be increased toward what it would have been with the 40 foot pound torque specification. At the same time, the backing action sets the teeth of the serrations 20c and 22c into the surface of the nut and the surface of the seat respectively so that no further motion in a loosening direction can take place. In addition, this reverse torque operation or backing off after full torquing takes out some of the twist or torsional deflection remaining in the bolt as the result of the tightening operation. This relieves some of the fundamental residual forces normally left in torque joints after the tightening that can operate over periods of time to cause loosening of the joint under vibratory loads. In order for this setting or backing off action to occur, the stored spring force energy driving the washers in opposite directions must be sufficient to overcome the difference between the friction torque between the seating surface and the washer and the friction torque between the ramp surfaces plus the wedge angle which may be, for example, in the order of 10 degrees. As the digging in process starts, the stored spring force energy begins to be dissipated by the relative movement up the wedges which forces the setting action desired. The amount of preload necessary to accomplish the digging in for optimum locking will of course vary for different joints.

Figure 10:
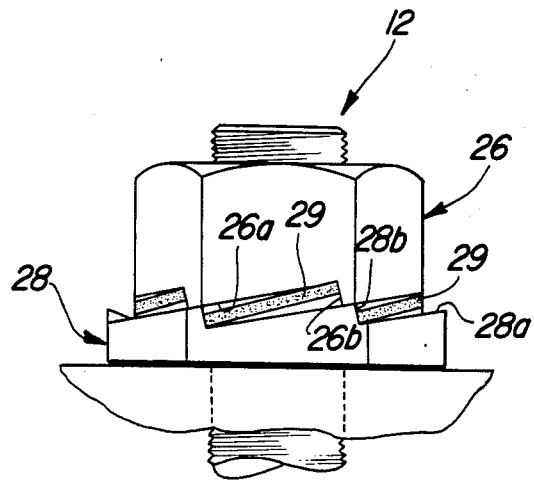
FIG. 10 is a side view of a further embodiment of the invention locking fastener shown in an unloaded condition.
Figure 11:
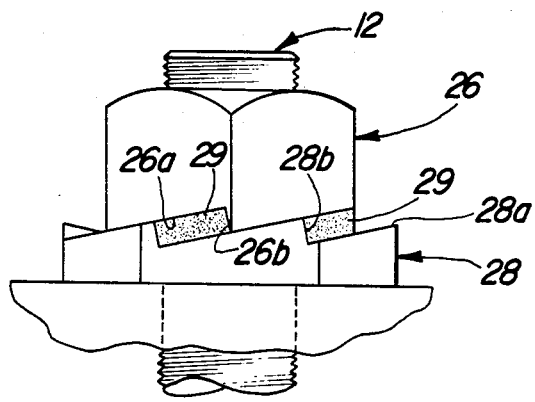
FIG. 11 is a side view of the locking fastener of FIG. 10 shown in a loaded condition.
Figure 12:
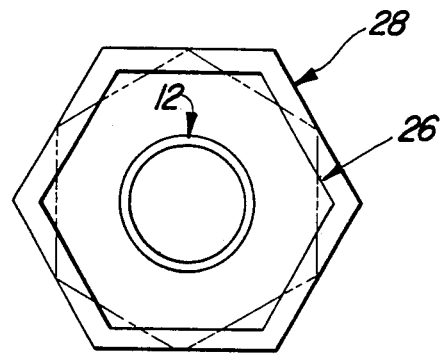
FIG. 12 is a top view of the locking fastener of FIGS. 10 and 11.

The locking fastener seen in FIGS. 10-12 is similar to the locking fastener seen in FIGS. 7-9 in the sense that the fastener comprises upper and lower annular members and spring members interposed between coacting ramp surfaces defined on the upper and lower members. However, in the FIG. 10-12 embodiment, the upper annular member comprises a hexagonal nut 26 for threaded coaction with the fastener member 12 and the lower annular member comprises a hexagonal washer 28 having a larger outside hexagonal shape than the nut. Coacting ramp surfaces 26a and 28a are provided on the nut and on the washer and abutment surfaces 26b and 28b are provided in association with each ramp surface. A rubber spring element 29 is interposed between each pair of coacting ramp surfaces. Spring elements 29 are secured at their opposite ends to successive abutment surfaces 28b and 26b so that the rubber springs are compressed to fill the entire space between the confronting ramp surfaces as the locking fastener is moved to its locking or loaded position as seen in FIG. 11.

A special torque wrench (not shown), with both the nut and washer hex sizes in it, could be used to tighten and loosen the locking fastener of FIGS. 10-12 so as to control the relative rotation for the locking action and the setting action to achieve precise and controllable initial locking and precise and controllable backing off or setting action. The smaller hex fitting the nut would be used to tighten the nut with the larger hex free wheeling so that it drags behind the inside or smaller hex as the spring elements between the nut and the washer are compressed during tightening. When the desired torque is reached for the bolt load desired, the angle between the smaller hex and the larger hex would indicate the amount of preload put into the springs. Furthermore, to ensure setting, the larger hex wrench on the washer could then be held stationary while the smaller hex on the nut could be backed-off a preset angle before beginning to free wheel so that a good set could be assured.

For those designs incorporating rubber or rubber-like spring elements between the upper and lower members (FIGS. 7-9 and 10-12) it may be desirable to eliminate one or more of the spring elements and to shorten the length of the ramps where the eliminated spring element would have been installed so that metal-to-metal contact occurs between the two members after the full spring load has been applied during the tightening process. Experience has shown that rubber and rubber-like materials may not be able to take the full tightening force in compression and may be extruded out of the space between the locking members. One or more metal-to-metal stops arranged to contact at the desired pre-load deflection of the rubber would prevent this.

Figure 13:
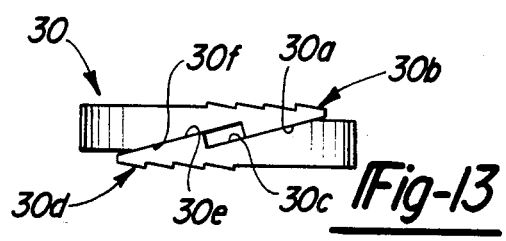
FIG. 13 is a side view of a further embodiment of the invention locking fastener shown in an unloaded condition.
Figure 14:
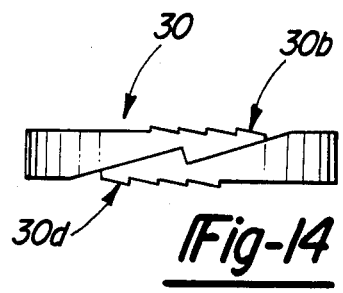
FIG. 14 is a side view of the locking fastener of FIG. 13 shown in a loaded condition.
Figure 15:
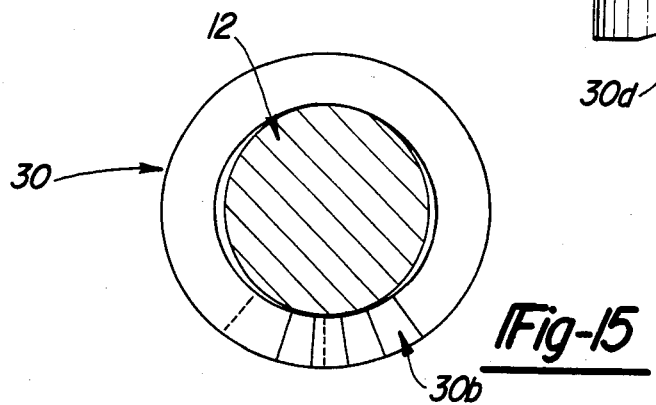
FIG. 15 is a top view of the locking fastener of FIG. 13 showing its disposition in the loaded condition relative to the associated bolt.

The locking fastener 30 of FIGS. 13–15 is similar to the locking fastener 10 of FIGS. 1–3 with the exception that the lock washer is arranged to expand radially in response to tightening of the associated nut. Specifically, as the associated nut is tightened, ramp surface 30a on end 30b slides downwardly along ramp surface 30c on end 30d and ramp surface 30e on end 30d slides downwardly along ramp surface 30f on end 30b to decrease the axial thickness of the washer but increase the radial dimension of the washer. Thus, as seen in FIG. 15, as the associated nut is tightened, the washer expands and is deflected outwardly away from the bolt to preclude interference between the washer and the bolt which, in some applications, can interfere with the tightening action of the locking fastener assembly.

The invention locking fasteners will be seen to provide an improved locking fastener in which the spring elements act constantly to drive the opposed wedge surfaces in opposite rotational directions to increase the locking action so that the spring elements and the wedge surfaces coact on a continuing basis to preclude loosening of the joint.

Whereas preferred embodiments of the invention have been illustrated and described in detail, it will be apparent that various changes may be made in the disclosed embodiments without departing from the scope or spirit of the invention.

I claim:

1. An annular locking fastener adapted to be mounted on an elongated threaded member, said locking fastener comprising:
    (A) a first portion;
    (B) a second portion movable relative to said first portion;
    (C) confronting coacting parallel first and second ramp surfaces on said first and second portions, respectively, inclined at a circumferential angle of at least 7° and movable into sliding wedging contact with each other in response to relative movement between said portions in a first, tightening direction to cause said first ramp surface to move slidably down said second ramp surface to decrease the overall axial height of said fastener and operative in response to relative movement between said portions in the opposite, loosening direction to cause said first ramp surface to move slidably up said second ramp surface to increase said overall height; and
    (D) spring means yieldably resisting relative movement of said portions in said first, tightening direction and operative in response to such tightening movement to store energy in said fastener biasing said portions for movement in said opposite, loosening direction to urge said first ramp surface to move slidably up said second ramp surface to increase the overall height of the fastener.

2. A locking fastener according to claim 1 wherein:
    E. said fastener comprises a spring washer having a helical configuration with the successive convolutions of the helix spaced axially in the relaxed configuration of the washer; and
    F. a plurality of pairs of first and second ramp surfaces are provided at circumferentially spaced locations around the convolutions of said washer with each pair comprising a first ramp surface on the upper face of a lower convolution and a second coacting ramp surface on the confronting lower face of an upper convolution.

3. A locking fastener according to claim 1 wherein:
    E. said fastener comprises a split lockwasher formed of a spring material and having a relaxed configuration in which its opposite ends are spaced;
    F. said opposite ends of said lockwasher respectively constitute said first and second fastener portions; and
    G. said ramps are configured to undergo such relative movement in response to radial contraction and expansion of said lockwasher.

4. A locking fastener according to claim 3 wherein:
    H. each of said ramp surfaces extends at said circumferential angle from the respective end face of said lockwasher;
    I. a generally axially extending abutment surface extends from the inboard end of each ramp surface to the adjacent upper or lower face of said lockwasher; and
    J. each end face is spaced circumferentially from the associated abutment surface in the relaxed configuration of said lockwasher.

5. A locking fastener according to claim 4 wherein:
    K. said ramp surfaces are spaced axially in the relaxed configuration of said lock washer.

6. A locking fastener according to claim 1 wherein:
    E. said fastener comprises an upper annular member constituting said first portion and a lower annular member constituting said second portion;
    F. said first and second ramp surfaces are defined respectively on the upper face of said lower annular member and on the confronting lower face of said upper annular member; and
    G. said spring means comprises a resilient member interposed between said first ramp surface on said lower annular member and said second ramp surface on said upper annular member and arranged to be loaded in response to relative movement of said ramp surfaces in said lightening direction.

7. A locking fastener according to claim 6 wherein:
    H. a plurality of pairs of first and second ramp surfaces are respectively provided at circumferentially spaced locations around said first and second annular members; and
    I. a resilient member is interposed between each pair of ramp surfaces and arranged to be loaded in response to relative movement of the associated ramp surfaces in said tightening direction.

8. A fastener according to claim 7 wherein:
    J. said lower annular member comprises a washer; and
    K. said upper annular member comprises a nut adapted to be threaded onto the elongated threaded member.

9. A locking fastener according to claim 7 wherein:
    J. each of said resilient members is respectively secured at its opposite ends to said first and second annular members so as to hold said annular members together for assembly purposes and determine their relative axial and circumferential positions to control the spring means preload 10. A fastener according to claim 7 wherein:
    J. said upper and lower annular members comprise upper and lower washers.

11. A fastener according to claim 10 wherein:
    K. said upper washer has serrations on its upper face; and
    L. said lower washer has serrations on its lower face.

* * * * *